United States Patent
Yang et al.

(10) Patent No.: US 6,343,304 B1
(45) Date of Patent: Jan. 29, 2002

(54) APPARATUS WITH SELECTIVE FIXED-COEFFICIENT FILTER FOR PERFORMING RECURSIVE DISCRETE COSINE TRANSFORMS

(75) Inventors: Jar-Ferr Yang, Tainan; Chih-Peng Fan, Miaulee Hsien, both of (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/265,102

(22) Filed: Mar. 9, 1999

(51) Int. Cl.$^7$ .............................................. G06F 17/14
(52) U.S. Cl. ...................................................... 708/402
(58) Field of Search .......................................... 708/402

(56) References Cited

U.S. PATENT DOCUMENTS

| | | | |
|---|---|---|---|
| 4,023,028 A | 5/1977 | Dillard | 235/156 |
| 4,058,715 A | 11/1977 | Niwa | 364/726 |
| 4,080,661 A | 3/1978 | Niwa | 364/726 |
| 4,569,030 A | 2/1986 | Butterweck et al. | 364/724 |
| 4,612,626 A | 9/1986 | Marchant | 364/726 |
| 6,052,703 A | * 4/2000 | Redford | 708/402 |
| 6,185,595 B1 | * 2/2001 | Hori et al. | 708/402 |

OTHER PUBLICATIONS

Goertzel, "An Algorithm for the Evaluation of Finite Trigonometric Series," American Math, Monthly, 65:34–35 (Jan., 1958).

Wang, et al., "Recursive Algorithms for the Forward and Inverse Discrete Cosine Transform with Arbitrary Length," *IEEE Signal Processing Letters*, 1:101–102 (Jul., 1994).

Aburdene, et al., "Computation of Discrete Cosine Transform Using Clenshaw's Recurrence Formula," *IEEE Signal Processing Letters*, 2(8):155–156 (Aug., 1995).

Chiang, et al., "Regressive Implementation for the Forward and Inverse MDCT in MPEG Audio Coding," *IEEE Signal Processing Letters*, 3(4):116–118 (Apr., 1996).

Liu, et al., "Unified Parallel Lattice Structures for Time–Tecursive Discrete Cosine/Sine/ Hartley Transforms," *IEEE Transactions on Signal Processing*, 41(3):1357–1377 (Mar., 1993).

Chau, et al., "Direct Formulation for the Realization of discrete Cosine Transform Using Recursive Structure," *IEEE Transactions on Circuits and Systems–II:Analog and digital Signal Processing*, 42(1):50–53 (Jan., 1995).

* cited by examiner

Primary Examiner—David H. Malzahn
(74) Attorney, Agent, or Firm—McAndrews, Held & Malloy Ltd.

(57) ABSTRACT

An apparatus with new fixed-coefficient recursive structures for computing discrete cosine transforms with the power-of-two length is disclosed. The fixed-coefficient recursive structures are developed from exploration of periodicity embedded in transform bases, whose indices can form a complete residue system or a complete odd residue system. Distinctively, we found that properly selected fixed-coefficient filters achieve lower round-off errors than the nominal variable-coefficient ones for computing DCTs in finite-word-length machines.

29 Claims, 8 Drawing Sheets

APPARATUS WITH SELECTIVE FIXED-COEFFICIENT FILTER FOR PERFORMING RECURSIVE DISCRETE COSINE TRANSFORMS

FIELD OF THE INVENTION

The present invention relates to an apparatus with a selective fixed-coefficient filter, and more particularly to an apparatus with a selective fixed-coefficient filter for recursively computing N points discrete cosine transforms (DCTs).

BACKGROUND OF THE INVENTION

The discrete cosine transforms (DCTs) are widely applied to processing and compression of video and audio signals and other fields related to spectral analyses and parameter estimations. Therefore, the development of a simple implementation of discrete cosine transform becomes very important. Recently, the recursive implementation of orthogonal transforms gains a lot of attentions since they are characterized in a simple structure and local communication. Goertzel first used the periodicity of finite trigonometric sequences to realize the discrete Fourier transform in a simple recursive structure. Goertzel's recursive structure not only reduces the number of computation, but also simplifies the complexity of implementation. After that, there are several recursive algorithms innovated to achieve regular implementation of DCTs, for example, the recursive algorithms for the DCT and inverse DCT with arbitrary length, the structures of recursive algorithms of normal and inverse DCT, the DCT with the power of two length in the recursive structures of several groups, a general discrete sinusoidal transform, and a two dimensional DCT/IDCT VLSI design characterized in formulation, regularization, and rank modulation.

U.S. Pat. No. 4,023,028 disclosed the operation and the recursive structure of fully digital recursive computation DFT. U.S. Pat. No. 4,058,715 indicated that the algebraic manipulation units for computing FFT are serially combined and each of them is a recursive computation structure. U.S. Pat. No. 4,080,661 disclosed the algebraic manipulation unit in a type of recursive without needing a multiplier. A common type of second order recursive digital filter is disclosed in U.S. Pat. No. 4,569,030. In U.S. Pat. No. 4,612,626, two FFT computations of real number sequence inputs are implemented with two recursive FFT structures. These recursive computation algorithms provide some advantages for VLSI implementation.

A fixed-coefficient recursive structure for computing the prime length DCT has been proposed. However, the most common length of DCTs is power of two. A fixed-coefficient recursive structure for realizing the time domain aliasing cancellation (TDAC) filtering processes has also been discussed.

As the discrete cosine transform with the recursive algorithms are obtained by the above-mentioned method, the filter coefficients vary along with the corresponding frequency-index components in the recursive structures. Each set of filter coefficients can only compute a specific transformed output. Accordingly, a variable-coefficient multiplier in a recursive IIR filter is required to obtain all desirable transformed results. Therefore, a variable-coefficient multiplier needs a generally typical multiplier with N deposited multiplicands for a transformation length of N. Besides, some filter coefficients can shift an IIR filter to a nearly unstable state, resulting in several inaccurately recursive results, particularly in finite-word-length machines. This problem can be solved by increasing the word length in a processor. However, to own a high-speed multiplier with a long word length is pretty expensive. Practically, the shortcoming of a recursive structure is that it requires a very high speed and accurate processing unit, such as IIR filter multiplier.

Therefore, it is tried by the applicant to deal with the situation encountered with the prior art.

SUMMARY OF THE INVENTION

An object of the present invention is to provide a new category of fixed-coefficient recursive structures for computing discrete cosine transforms in power-of two length. By using number theorems, the fixed-coefficient recursive structures are developed from exploration of periodicity embedded in transform bases which form a complete residue system or a complete odd residue system. Based on permutation, sign change, and zero insertion of original inputs, the proposed filtering structures required fixed multipliers are better than the previous recursive methods which need general multipliers. In finite length machines, properly selected filter coefficients can avoid previous unstable state upon accessing and achieve low round-off errors in their transformations.

According to one aspect of the present invention, the apparatus with a selective fixed-coefficient filter for recursively computing N points discrete cosine transform (DCT) is provided. The apparatus includes a data manipulation unit for obtaining 2N new inputs through permutation, sign change, and zero insertion of original inputs for computing coefficient values of the N points discrete cosine transformn, and a second order filter electrically connected to the data manipulation unit for selecting a fixed-coefficient so as to perform the N points discrete cosine transform through 2N recursive operations based on the permuted 2N new inputs.

In a preferred embodiment, the N is a power of two.

In another preferred embodiment, the N points discrete cosine transform is a second type of discrete cosine transform (DCT-II).

Preferably, the second order filter has a fixed loop coefficient and a fixed output coefficient in accordance with the computation of the second type of discrete cosine transform.

Preferably, the fixed loop coefficient is $2\cos(q\pi/2N)$ and the fixed output coefficient is $-\cos(q\pi/4N)$.

Preferably, the q and the 2N are relatively prime and the q is a selected relatively larger positive integer but not greater than N−1.

Preferably, the data manipulation unit reads y[n] in sequence according to m, in which n and m satisfy $q(2m+1)=(2n+1)(2k+1) \bmod 4N$ and a dummy zero data is appended to the y[n] which has a sign of $(-1)^{r_4}$ if n is greater than N−1, where $r_4=[(2n+1)(2k+1)/4N]$.

Preferably, the second type of discrete cosine transform is commonly called discrete cosine transform (DCT).

In a preferred embodiment, the N points discrete cosine transform is a third type of discrete cosine transform (DCT-III).

Preferably, the second order filter has a fixed loop coefficient and a fixed output coefficient in accordance with the computation of the third type of discrete cosine transform.

Preferably, the fixed loop coefficient is $2\cos(q\pi/2N)$ and the fixed output coefficient is $\cos(q\pi/2N)$.

Preferably, the q and the 2N are relatively prime and the q is a selected relatively larger positive integer but not greater than N−1.

Preferably, the data manipulation unit reads y[n] in sequence according to m in accordance with the computation of the third type of discrete cosine transform, in which n and m satisfy n(2k+1)mod 2N=qm mod 2N, and a dummy zero data is appended to the y[n] which has a sign of $(-1)^{r_3}$ if n is greater than N−1, where $r_3=\lceil n(2k+1)/2N\rceil$.

Preferably, the third type of discrete cosine transform is commonly called inverse discrete cosine transform (IDCT).

Preferably, the data manipulation unit includes an address generator based on a read only memory (ROM).

Preferably, the ROM contains computed data of n(2k+1) mod 2N=qm' mod 2N and the mapping sequence and the sign change from n to m' for completing an index mapping from m' to n.

Preferably, the ROM contains computed data of (2n+1)(2k+1) mod 2N=q(2 m'+1)mod 2N and the mapping sequence and sign change from n to m' for completing an index mapping from m' to n.

Preferably, the data manipulation unit includes an address generator having a read only memory (ROM), an adder, a counter, a shifter, a comparator, and a first-in-first-out (FIFO) buffer.

In a preferred embodiment, the N points discrete cosine transform is a fourth type of discrete cosine transform (DCT-IV).

In another preferred embodiment, the second order filter has a fixed loop coefficient and a fixed output coefficient in accordance with the computation of the fourth type of discrete cosine transform.

Preferably, the fixed loop coefficient is 2 cos(qπ/2N) and the fixed output coefficient is −cos(qπ/4N).

Preferably, the q and the 2N are relatively prime and the q is a selected relatively larger positive integer but not greater than N−1.

Preferably, the data manipulation unit reads y[n] in sequence according to m, in which n and m satisfy q(2m+1)=(2n+1)(2k+1)mod 4N and a dummy zero data is appended to the y[n] which has a sign of $(-1)^{r_4}$ if n is greater than N−, where $r_4=\lceil (2n+1)(2k+1)/4N\rceil$.

Preferably, the data manipulation unit includes an address generator based on a read only memory (ROM).

Preferably, the ROM contains computed data of n(2k+1) mod 2N=qm' mod 2N and the mapping sequence and the sign change from n to m' for completing an index mapping from m', to n.

Preferably, the ROM contains computed data of (2n+1)(2k+1) mod 2N=q(2 m'+1)mod 2N and the mapping sequence and the sign change from n to m' for completing an index mapping from m' to n.

Preferably, the data manipulation unit includes an address generator having a read only memory (ROM), an adder, a counter, a shifter, a comparator, and a first-in-first-out (FIFO) buffer.

The present invention may best be understood through the following description with reference to the accompanying drawings, in which:

DETAILED DESCRIPTION OF THE PREFERRED EMBODIMENTS

Figure 1:
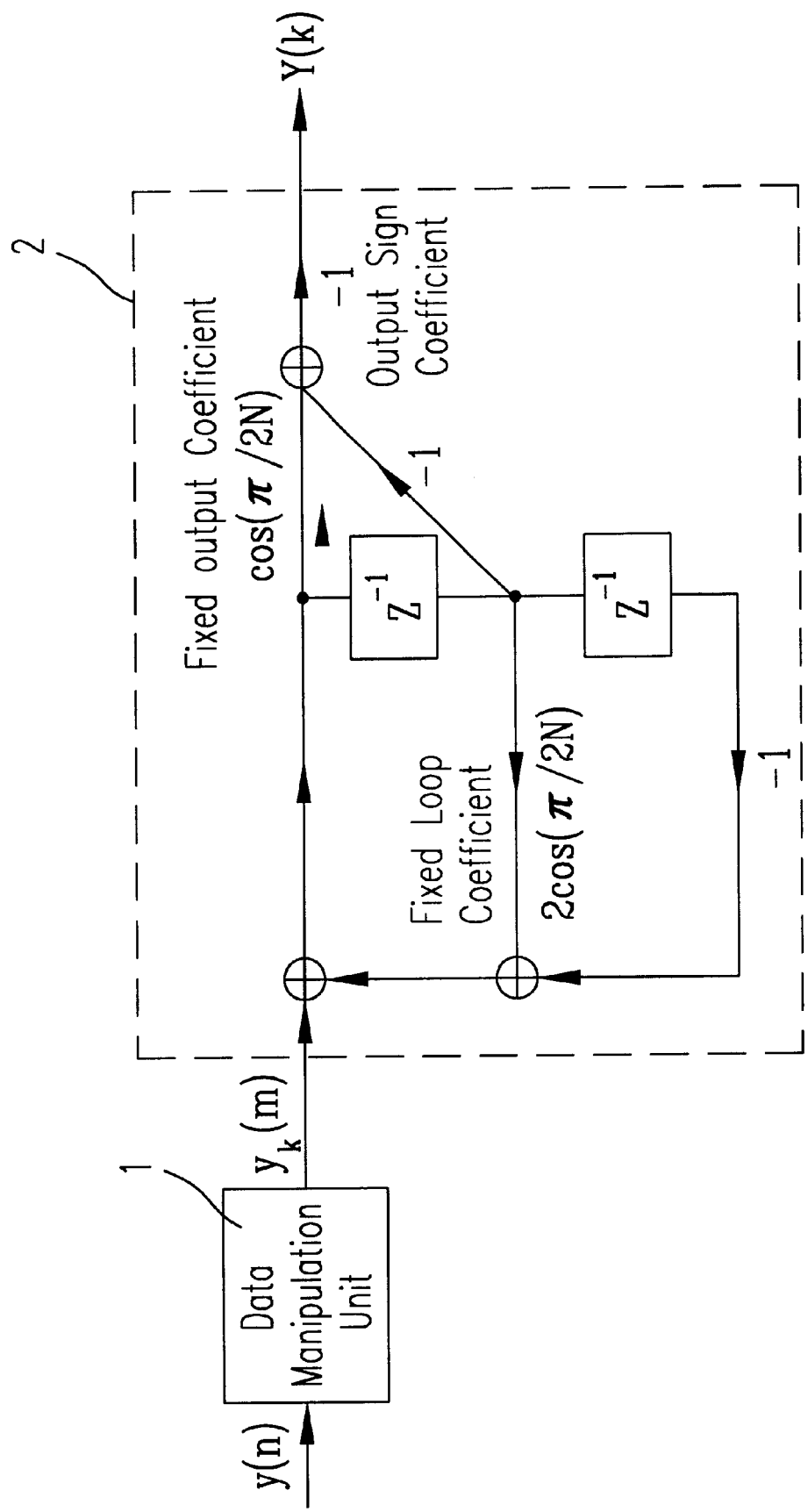
FIG. 1 shows the fixed-coefficient recursive structure for realizing the DCT-III according to the present invention.

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

1. An Introduction for Discrete Cosine Transform

The discrete cosine transform (DCT) can be categorized into four types. The most well known DCT and inverse DCT are respectively DCT-II and DCT-III. Because of their similarity in algorithm expressions, an inverse transform of one type of DCT can be a normal transform of another type of DCT if the modified scale factor and the changed indices are ignored. For example, the inverse transform of DCT-II is the normal transform of DCT-III, while the inverse transform of DCT-III is the normal transform of DCT-II. For convenience sake, the scale factors of discrete cosine transform is ignored in the following derivations.

Therefore, the well-known DCT-II and DCT-III are given by $$\text{DCT-II: } Y_2(k) = \sum_{n=0}^{N-1} y(n)\cos\left(\frac{\pi(2n+1)k}{2N}\right), k = 0, 1, \ldots, N-1, \quad (1)$$

and $$\text{DCR-III: } Y_3(k) = \sum_{n=0}^{N-1} y(n)\cos\left(\frac{\pi(2k+1)n}{2N}\right), k = 0, 1, \ldots, N-1, \quad (2)$$

To develop the DCT-II recursive algorithm, the recursive DCT-IV structure must be designed at first, where the DCT-IV is expressed by $$Y_4(k) = \sum_{n=0}^{N-1} y(n)\cos\left(\frac{\pi(2n+1)(2k+1)}{4N}\right), k = 0, 1, \ldots, N-1. \quad (3)$$

As the discrete cosine transforms is considered by the prior recursive methods, the filter coefficients in the conventional recursive structure are related to the corresponding frequency components. In the following sections, a recursive structure with fixed-coefficient is developed to implement these discrete cosine transforms.

2. Recursive Cosine Structures with Fixed Coefficients

Because there are three different types of discrete cosine transforms which use different derivative procedures, their fixed-coefficient recursive structures will be described in the following sections, respectively. To fit the most common usage, fixed-coefficient recursive structures are derived by assuming the length of DCTs to be a power of two, i.e., $N=2^M$.

Since the indices of DCT-III bases can directly perform a complete residual system in modulo 2N, we first derive the fixed-coefficient recursive structure for the DCT-III. However, the indices of the DCT-II bases can not set up any complete residual or complete odd residual system in modulo 2N. In order to obtain a fixed-coefficient recursive structure for the DCT-II, the DCT-II is converted to the DCT-IV form, whose transform bases form a complete odd residual system. Before the derivation of the DCT-II recursive structure, the fixed-coefficient recursive structure for the DCT-IV is discussed first.

2-1. Fixed Recursive Structure for DCT-III

The N points DCT-III depicted in Eq. (2) includes a discrete cosine transform base (TB) $\cos(\pi(2k+1)n/2N)$ which is periodic with respect to indices n and k. The integer form, $(2k+1)n/2N$, is the most important index related to the recursive cosine transform base. Eq. (2) can be rewritten as $$Y_3(k) = \sum_{n=0}^{N-1} y(n)\cos(\pi r_3 + \pi m_3/2N) \quad (4)$$

where $r_3 = \lceil n(2k+1)/2N \rceil$ and $m_3 = [n(2k+1) \bmod 2N]$. The rounding operator, $\lceil x \rceil$, denotes the integer part of x and the modulo operator, $[p \bmod 2N]$, expresses a positive integer less than 2N after the argument p is added or subtracted by a multiple of 2N. Because the transform base can be represented as $\cos(\pi(2k+1)n/2N) = (-1)^{r_3}\cos(\pi m_3/2N)$, the DCT-III in Eq. (4) becomes $$Y_3(k) = \sum_{n=0}^{N-1} [(-1)^{r_3} y(n)]\cos(\pi m_3/2N) \quad (5)$$

For exploring the periodicity in TB functions, we shall first preview several properties and theorems in number theory.

Definition 1: A set of P integers $a_1, a_2, \ldots, a_p$ is a complete residue (CR) system in modulo P if and only if $a_i \neq a_j \pmod{P}$ for $i \neq j$.

Theorem 1: Let $(a,P)=1$ and $r_1, r_2, \ldots, r_p$ is a complete residue system in modulo P. Then, $ar_1+b, ar_2+b, \ldots, ar_p+b$ is also a CR system in modulo P for an arbitrary integer b.

In Definition 1, the complete residue sequence $\{a_1, a_2, \ldots, a_p\}$ describes all the possible values in modulo P. In Theorem 1, (p, q)=1 means that the greatest common factor between p and q is 1, i.e., p and q are relatively prime.

From Definition 1, it is obvious that $\{n \bmod 2N | n=0, 1, 2, \ldots, 2N-1\}$ represents a CR system in modulo 2N. In Theorem 1 (a=2k+1, P=2N, and b=0), we know that (2k+1, 2N)=1 since N is a power of two. Thus, $\{m_3 | \text{for } n=0, 1, 2, \ldots, 2N-1\}$ is also a CR system in modulo 2N.

To utilize the CR concept, the summation index in Eqs. (2), (4), and (5) is extended to 2N-1, $$y(n)=0 \text{ for } n=N, N+1, \ldots, (2N-1) \quad (6)$$

By using these N dummy inputs and the above-mentioned properties, the summation index of the DCT-III can be changed from n to m as $$m = m_3 = n(2k+1) \bmod 2N, \quad (7)$$

the DCT-III in Eq. (5) becomes $$Y_3(k) = \sum_{n=0}^{2N-1} [(-1)^{r_3} y(n)]\cos(\pi m_3/2N) \quad (8)$$

$$= \sum_{m=0}^{2N-1} y_k(m)\cos(\pi m/2N)$$

where $$y_k(m) = (-1)^{r_3} y(n) \quad (9)$$

for $k=0, 1, \ldots, N-1$. Since $\{m = n(2k+1) \bmod 2N | \text{for } n=0, 1, 2, \ldots, 2N-1\}$ exhibits a CR system in modulo 2N, m and n become a frequency-dependent one-to-one mapping defined by Eq. (7). Thus, the conversion of the summation index from n to m will not change final results. The DCT-III transform stated in Eqs. (8) and (9) becomes a fixed transformation once the frequency-dependent permuted, sign-changed, and zero-inserted data sequence of $y_k(m)$ is obtained.

Now, a fixed-coefficient DCT-III recursive structure is developed by replacing m with 2N-1-m in (8) to obtain $$Y_3(k) = (-1)\sum_{m=0}^{2N-1} y_k(2N-1-m)\cos(\pi(m+1)/2N) \quad (10)$$

By letting $\theta = \pi/2N$ and $T(\theta_m) = \cos(m\theta)$, we define $$Y_3(k, j) = \sum_{m=0}^{j} y_k(j-m) T(\theta_{m+1}) \quad (11)$$

By using the similar procedures described by Wang et al., we obtain the recursive formula as $$Y_3(k,j) = \cos(\theta) y_k(j) - y_k(j-1) + 2\cos(\theta) Y_3(k,j-1) - Y_3(k,j-2) \quad (12)$$

Based on the recursive index j, we obtain the z-transform of Eq. (12) as $$\frac{Y_3(k, z)}{y_k(z)} = \frac{\cos(\theta) - z^{-1}}{1 - 2\cos(\theta)z^{-1} + z^{-2}} \quad (12)$$

After 2N-1 recursive cycles depicted in Eq. (13), the transformed result can be obtained as $Y_3(k) = (-1)Y_3(k, 2N-1)$. FIG. 1 shows the fixed-coefficient recursive structure for realizing the DCT-III transform according to the present invention. The fixed loop filter coefficient, $2\cos(\pi/2N)$, is executed in each of recursive cycles; however, the fixed output coefficient $\cos(\pi/2N)$ and the output sign coefficient −1 need to be performed only once for each frequency component.

2-2. Fixed Recursive Structure for DCT-IV

The N points DCT-IV depicted in Eq. (3) includes a discrete cosine transform base $\cos(\pi(2k+1)(2n+1)/2N)$ in which the indices n and k are periodic. Similarly, we only pay attention to the integer form, $(2k+1)(2n+1)/2N$. Then, the DCT-IV can be expressed as $$Y_4(k) = \sum_{n=0}^{N-1} [y(n)(-1)^{r_4}]\cos(\pi m_4/4N) \quad (14)$$

where $$r_4 = \lceil (2n+1)(2k+1)/4N \rceil$$

and $$m_4 = [(2n+1)(2k+1) \bmod 4N].$$

For exploring its periodicity, we shall define another residue system.

Definition 2. A set of P odd integers $a_1, a_2, \ldots, a_P$ is the complete odd residue (COR) system in modulo 2P if and only if $a_i \neq a_j \pmod{2P}$ for $i \neq j$.

It is obvious that $\{(2n+1) \bmod 4N | n=0, 1, 2, \ldots, 2N-1\}$ sets up a COR system in modulo 4N. This complete odd residue system $\{1, 3, 5, \ldots, 4N-1\}$ is a reduced residue system. Because $(2n+1)(2k+1)$ is an odd number for any integers n and k, $(2n+1)(2k+1) \bmod 4N$ is also an odd number for any integers n and k. By Theorem 1 and letting a=2k+1, P=2N, and b=0, $\{(2n+1)(2k+1) \bmod 4N | n=0, 1, 2, \ldots, 2N-1\}$ which consists of 2N different odd integers, also sets up a COR system in modulo 4N.

However, $\{(2n+1) \bmod 4N | \text{for } n=0,1, \ldots, N-1\}$ which possesses N different odd integers $r_0, r_1, \ldots, r_{N-1}$, supports only one half of the COR system in modulo 4N. From Theorem 1 and $(2k+1, 4N)=1$, it implies that $\{(2n+1)(2k+1) \bmod 4N \text{ for } n=0,1, \ldots, N-1\}$ also sets up one half of the COR system in modulo 4N. It is similar to the discussion in the Eq. (6) so that the summation index in Eqs. (3) and (14) can be increased up to 2N−1 by appending dummy zero data. Thus, a new input sequence $\tilde{y}_k(2m+1)$ is defined as $$\tilde{y}_k(2m+1) = (-1)^{\lceil (2n+1)(2k+1)/4N \rceil} y(n) \quad (15)$$

where $$(2m+1) = (2n+1)(2k+1) \bmod 4N \quad (16)$$

for n=0, 1, ..., 2N−1. For simplicity, we let $y_k(m) = \tilde{y}_k(2m+1)$. From Eqs. (15) and (16), after zero insertion, permutation, and sign change of inputs, the DCT-IV transform is expressed as 2N−1

$$Y_4(k) = \sum_{m=0}^{2N-1} y_k(m)\cos(\pi(2m+1)/4N) \quad (17)$$

where k=0, 1, ..., 2N−1.

To compute Eq. (17), we start to develop its recursive structure in the follows. By replacing m with 2N−1−m in Eq. (17), then $$Y_4(k) = (-1)\sum_{m=0}^{2N-1} y_k(2N-1-m)\cos(\pi(m+1/2)/4N) \quad (18)$$

Let $$\theta = \frac{\pi}{2N}, \theta_m = \frac{\pi(m+1/2)}{2N},$$

and $T(\theta_m) = \cos(\theta_m)$, we define $$Y_4(k, j) = \sum_{m=0}^{j} y_k(j-m)T(\theta_m) \quad (19)$$

By using a similar method, the recursive formula is $$Y_4(k,j) = \cos(\theta/2)[y_k(j)-y_k(j-1)] + 2\cos(\theta)Y_4(k,j-1) - Y_4(k,j-2) \quad (20)$$

Based on the time recursive index j, the z-transform of the recursive formula is $$\frac{Y_4(k, z)}{y_k(z)} = \frac{\cos(\theta/2)(1-z^{-1})}{1-2\cos(\theta)z^{-1}+z^{-2}} \quad (21)$$

Figure 2:
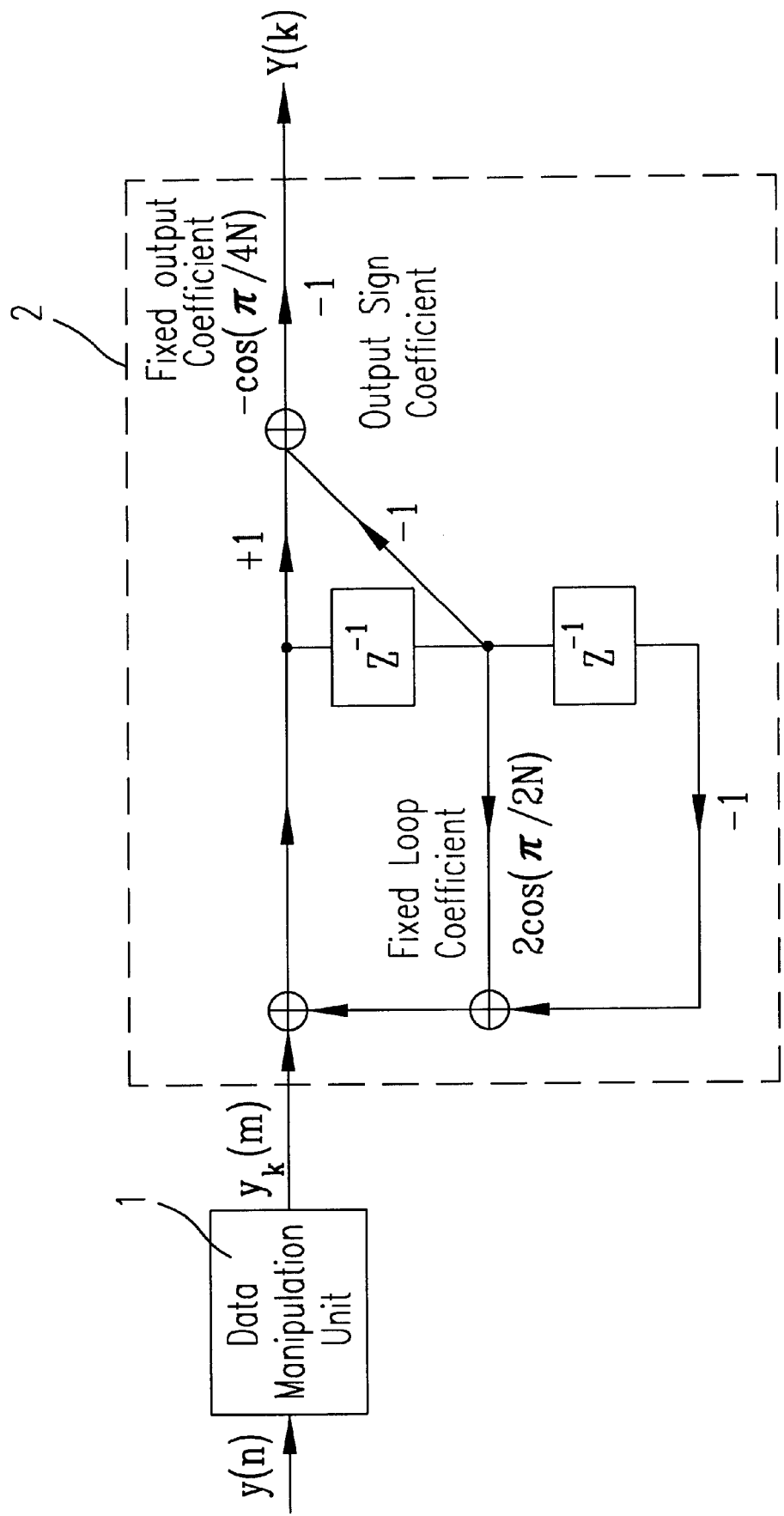
FIG. 2 shows the fixed-coefficient recursive structure for realizing the DCT-IV according to the present invention.

After 2N−1 recursive cycles depicted in (21), the transformed result can be obtained as $Y_4(k)=(-1)Y_4(k, 2N-1)$. FIG. 2 shows the DCT-IV fixed-coefficient recursive structure according to the present invention. The fixed loop filter coefficient, $2\cos(\pi/2N)$, is executed in each of recursive cycles; however, the fixed output coefficient, $-\cos(\pi/4N)$, needs to be performed only once for each frequency component. ps 2-3. Fixed Recursive Structure for DCT-II The N-point DCT-II stated in Eq. (1) possesses the cosine basis function as $\cos(\pi(2k+1)n/2N)$. Similarly, the integer factor $(2k+1)n/2N$ will be investigated. Since $(k, 2N) \neq 1$ for even number k, it is not sure that $\{(2n+1)k \bmod 2N | n=0, 1, \ldots, N-1\}$ forms a CR or COR system in modulo 2N by Theorem 1. In order to obtain a fixed-coefficient recursive structure for the DCT-II, the DCT-II is converted to the DCT-IV first.

From the trigonometric property of cosine function, we can hold the equality as $$\cos\left(\frac{(2n+1)(k+1)\pi}{2N}\right) = \quad (22)$$
$$2\cos\left(\frac{(2n+1)\pi}{4N}\right)\cos\left(\frac{(2n+1)(2k+1)\pi}{4N}\right) - \cos\left(\frac{(2n+1)k\pi}{2N}\right)$$

By multiplying y(n) to each side of (22) and summing up every terms for both sides, another formula is obtained as follows, $$\sum_{n=0}^{N-1} y(n)\cos\left(\frac{(2n+1)(k+1)\pi}{2N}\right) = \quad (23)$$
$$\sum_{n=0}^{N-1} 2y(n)\cos\left(\frac{(2n+1)\pi}{4N}\right)\cos\left(\frac{(2n+1)(2k+1)\pi}{4N}\right) -$$
$$\sum_{n=0}^{N-1} y(n)\cos\left(\frac{(2n+1)k\pi}{2N}\right)$$

By using Eqs. (1) and (3) and letting $$\tilde{y}(n) = 2\cos(\theta_n)y(n) \quad (24)$$

the relationship between DCT-II and DCT-IV is $$Y_2(k+1) = \sum_{n=0}^{N-1} \tilde{y}(n)\cos\left(\frac{(2n+1)(k+1)\pi}{2N}\right) - Y_2(k) \quad (25)$$

where $$\theta_n = (2n+1)\pi/4N.$$

From Eq. (1), we know $$Y_2(0) = \sum_{n=0}^{N-1} y(n).$$

Figure 3:
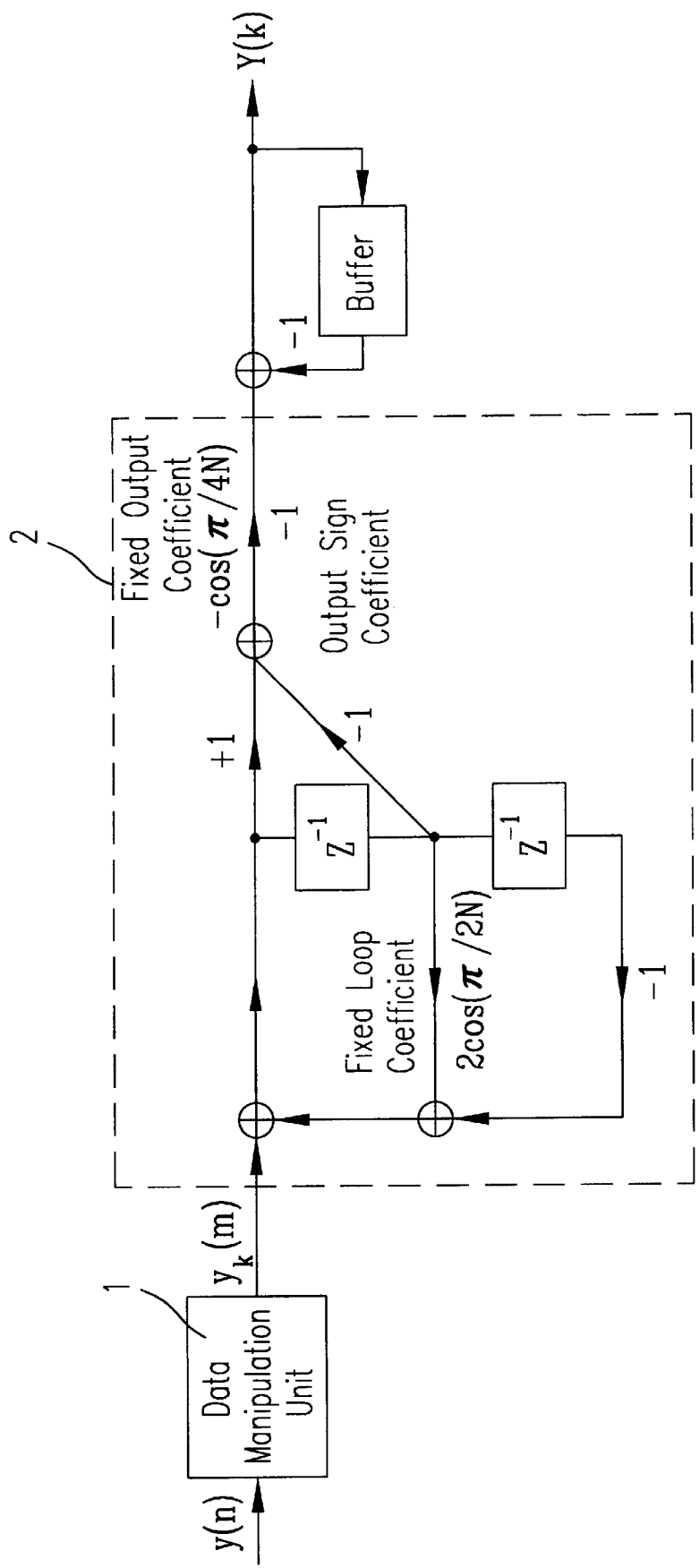
FIG. 3 shows the fixed-coefficient recursive structure for realizing the DCT-II according to the present invention.

If the fixed-coefficient DCT-IV recursive structure is employed to compute the DCT-IV of $\tilde{y}(n)$, the DCT-II coefficients can be obtained recursively from Eq. (25). FIG. 3 shows the complete realization of fixed-coefficient recursive structure for computing the DCT-II. To obtain $\tilde{y}(n)$, N multiplications are needed for a frequency-independent weighted procedure. However, this procedure can be merged into a normal window function so as to omit the computation of $\tilde{y}(n)$.

3. Selected and Fixed Recursive Structures

In the previous section, the IIR filters depicted in Eqs. (13) and (21) are actually marginal stable since they have a pair of conjugate poles on the unit circle. The filter coefficient in the recursive loop for DCT-II, DCT-III, and DCT-IV is $2\cos(\pi/2N)$, which is closed to 2. In such a situation, the IIR filters have adjacent double poles on the unit circle, resulting in a nearly unstable condition. It is noted that this nearly unstable condition also happens in all prior recursive structures when they compute small frequency-index coefficients. This nearly unstable condition causes some extraordinarily magnified recursive errors, which produces inaccuracy of transformed results specially in finite-word-length machines. On the contrary, if we can select a much smaller loop coefficient, we can greatly improve the round-off error for the recursive DCT structures. In this section, the recursive structures are modified to compute the DCTs precisely.

3-1. Selected and Fixed Recursive Structure for DCT-III

By using number theory, we can further expand the structure developed in the section 2-1 for selecting a recursive filter so as to obtain more accurately transformed data in finite-word-length for the DCT-III fixed recursive structure.

From Theorem 1, we can further choose $a=q$, $P=2N$ and $b=0$, in which q is relatively prime to 2N, i.e., $(q, 2N)=1$. Thus, $\{qm' \bmod 2N | \text{for } m'=0, 1, \ldots, 2N-1\}$ also forms a CR system in modulo 2N. By extending Eqs. (8) and (9), a modified permuted input sequence $y'_k(m')$ is obtained from $Y_k(m)$ as follows $$y'_k(m')=(-1)^{\lfloor qm'/2N \rfloor} y_k(m) \tag{26}$$

where $$m=qm' \bmod 2N \tag{27}$$

Thus, Eq. (8) is rewritten as $$Y_3(k) = \sum_{m'=0}^{2N-1} y'_k(m')\cos(\pi qm'/2N) \tag{28}$$

for $k=1, 2, \ldots, N-1$. In Eq. (28), by substituting $2N-1-m'$ for $m'$, the DCT-III becomes $$Y_3(k) = (-1)^q \sum_{m'=0}^{2N-1} y'_k(2N-1-m')\cos(\pi q(m'+1)/2N) \tag{29}$$

Let $$\hat{\theta} = \frac{q\pi}{2N}$$

and $T(\theta_{m'})=\cos(m'\hat{\theta})$, we define $$Y_3(k, j) = \sum_{m'=0}^{j} y'_k(j-m')T(\theta_{m'+1}) \tag{30}$$

By using similar procedure in Eq. (6), the recursive formula is obtained as follows, $$Y_3(k,j)=\cos(\hat{\theta})y'_k(j)-y'_k(j-1)+2\cos(\hat{\theta})Y_3(k,j-1)-Y_3(k,j-2) \tag{31}$$

Based on recursive index j, the z-transform of the recursive formula is obtained as $$\frac{Y_3(k, z)}{y'_k(z)} = \frac{\cos(\hat{\theta}) - z^{-1}}{1 - 2\cos(\hat{\theta})z^{-1} + z^{-1}} \tag{32}$$

After $2N-1$ recursive cycles depicted in Eq. (32), we obtain $Y_3(k)=(-1)^q Y_3(k, 2N-1)$. The modified fixed-coefficient implementation of the DCT-III depicted in Eq. (23) is shown in FIG. 1, in which the fixed loop coefficient, the fixed output coefficient, and the output sign coefficient are replaced by $2\cos(q\pi/2N)$, $\cos(q\pi/2N)$, and $(-1)^q$, respectively.

3-2. Selected and Fixed Recursive Structures for DCT-IV and DCT-II

Through the same procedure in the last section and Theorem 1, we now choose $a=q$, $P=4N$, and $b=0$, in which q is relative prime to 4N, i.e., $(q, 4N)=1$. Thus, we know that $\{q(2m'+1) \bmod 4N | m'=0, 1, \ldots, 2N-1\}$ also supports the COR system in modulo 4N. By extending Eqs. (15) and (16), the modified permuted input sequence $\tilde{y}'_k(2m'+1)$ is obtained from $\tilde{Y}_k(2m+1)$ as $$\tilde{y}'_k(2m'+1)=(-1)^{\lfloor q(2m'+1)/4N \rfloor} \tilde{y}_k(2m+1) \tag{33}$$

where the index mapping is depicted by $$(2m+1)=q(2m'+1) \bmod 4N \tag{34}$$

For simplicity, let $y'_k(m')=\tilde{y}'_k(2m'+1)$, where $m'=0, 1, \ldots, 2N-1$, and the modified DCT-IV is expressed by $$Y_4(k) = \sum_{m'=0}^{2N-1} y'_k(m')\cos(\pi q(2m'+1)/4N) \tag{35}$$

where $k=1, 2, \ldots, N-1$. In Eq. (35), by substituting $2N-1-m'$ for $m'$, the DCT-IV becomes $$Y_4(k) = (-1)^q \sum_{m'=0}^{2N-1} y'_k(2N-1-m')\cos(\pi q(m'+1/2)/2N) \tag{36}$$

Letting $$\hat{\theta} = \frac{q\pi}{2N}, \theta_{m'} = \frac{q(m'+1/2)\pi}{2N},$$

and $T(\theta_{m'})=\cos(\theta_{m'})$, we find $$T(\theta_{m'+1})=2\cos(\hat{\theta})T(\theta_{m'})-T(\theta_{m'-1}) \quad (37)$$

Let $$Y_4(k,j) = \sum_{m'=0}^{j} y'_k(j-m')T(\theta_{m'}) \quad (38)$$

By the same procedure as Eq. (6), a new recursive formula is obtained as follows $$Y_4(k,j)=\cos(\hat{\theta}/2)[y'_k(j)-y'_k(j-1)]+2\cos(\hat{\theta})Y_4(k,j-1)-Y_4(k,j-2) \quad (39)$$

Based on the recursive index j, the z-transform of the recursive formula is expressed by $$\frac{Y_4(k,z)}{y'_k(z)} = \frac{\cos(\hat{\theta}/2)(1-z^{-1})}{1-2\cos(\hat{\theta})z^{-1}+z^{-2}}$$

After 2N−1 recursive cycles depicted in Eq. (40), we obtain $Y_4(k)=(-1)^q Y_4(k, 2N-1)$, for k=0,1, ..., N−1. The modified fixed-coefficient recursive DCT-IV depicted in Eq. (40) is shown in FIG. 2, in which the fixed loop and output coefficients are changed to $2\cos(q\pi/2N)$ and $(-1)q\cos(q\pi/4N)$, respectively. Hence, the modified fixed-coefficient DCT-II recursive structure as shown in FIG. 3 can be easily obtained by replacing the fixed loop and output coefficients with $2\cos(q\pi/2N)$ and $(-1)q\cos(q\pi/4N)$, respectively.

4. Comparisons of Accuracy and Complexity

In order to compare the precision and complexity, various DCT implementation algorithms are realized in finite-word-length machines by simulations. As the outputs of the direct DCTs calculated in 64-bit computers are treated as the noise-free results, Tables 1, 2, and 3 respectively show the averaged SNRs for computing 64-point, 16-point, and 8-point DCT-IIIs in different word lengths. All simulation results show that the proposed fixed-coefficient recursive algorithms with q=47(N=64), q=15(N=16), and q=7(N=8) can obtain the best precision in finite-word-length machines. When q=1, the proposed fixed-coefficient DCT recursive algorithms produce the most serious round-off errors specially for a long transformation length (N=64).

Figure 7:
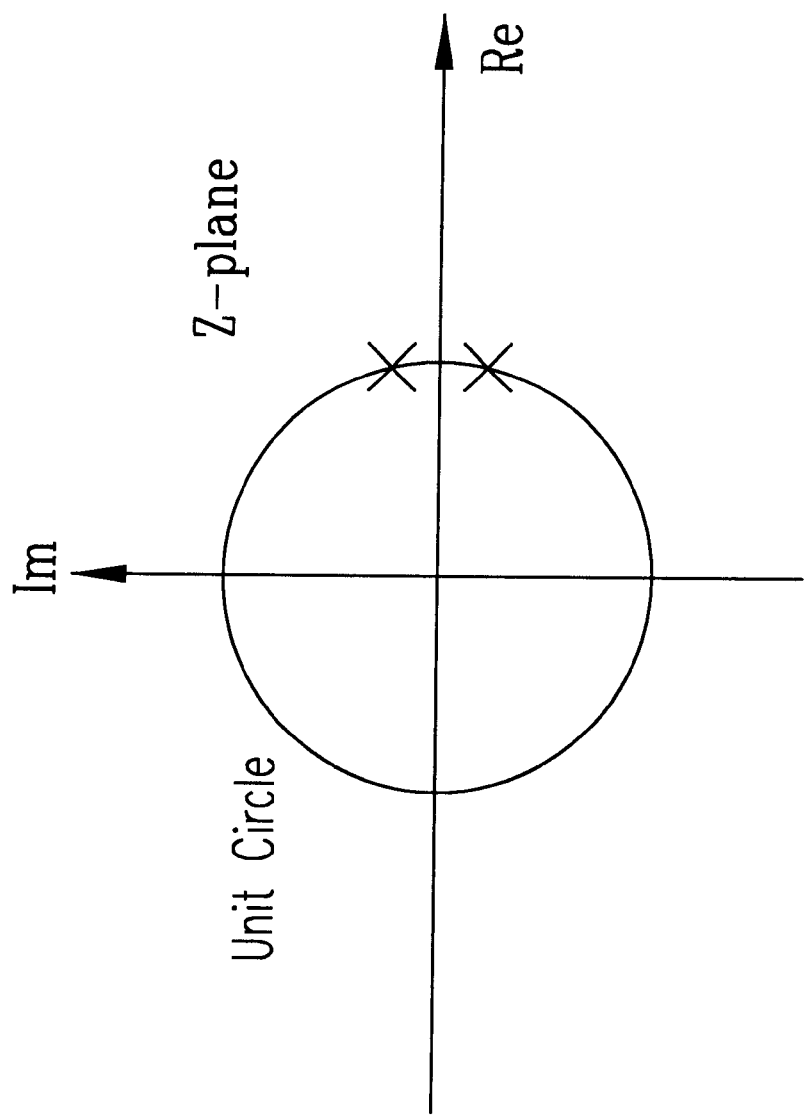
FIG. 7 shows the positions of the poles in a nearly unstable state of the recursive filter according to the present invention.
Figure 8:
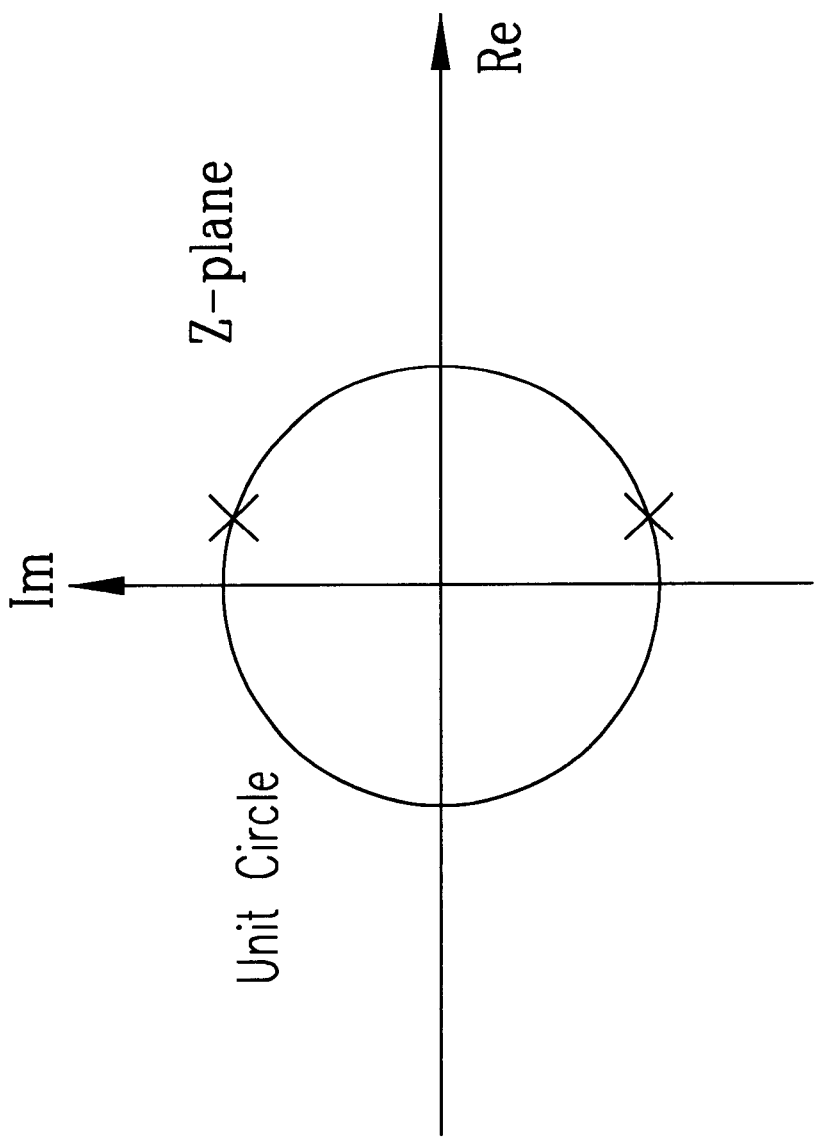
FIG. 8 shows the positions of the poles in a stable state of the recursive filter according to the present invention.

If the coefficient for recursive structure is selected improperly, the poles of recursive filter will be very close to each other, as shown in FIG. 7, and induce a nearly unstable state. After properly selecting coefficient for recursive structure and changing the coefficient to $2\cos(q\pi/2N)$, the unstable condition can be avoided. In FIG. 8, the poles of a recursive filter are separated on proper positions. The unstable situation will not be happened for a finite length of N recursive cycles. The direct implementation as depicted in Eqs. (1), (2), and (3) is a multiplication and addition structure, similar to an FIR filter structure, which is considered as one kind of recursive algorithms. There is a wide variety of cosine values of the multiplicand in the direct implementation causing larger round-off errors. After properly selecting fixed cosine values of multiplication, the recursive algorithm according to the present invention has a smaller and lower variety of cosine values, resulting in lower round-off errors. Therefore, the SNR values of the recursive algorithm according to the present invention are better than those of the direct implementation.

The traditional variable-coefficient recursive algorithms in average achieve considerably large round-off errors in the transformed results since they also have larger round-off errors in the transformed results in the smaller frequency-index components. In the variable-coefficient recursive algorithms, the quality of its first frequency component is similar to that of the fixed-coefficient recursive algorithms with q=1. It is noted that lower frequency components are usually more important than the larger ones in many analysis or compression applications. If the SNR of transformed results require about 80 dB, for example, an 18-bit machine for the proposed fixed-coefficient DCT-III recursive algorithm is chosen for the case of q=47 and N=64. From Table 1, it is found that the SNR of conventional recursive algorithms only reaches about 45.5 dB for the first frequency component. Thus, it needs 24-bit machines to maintain the SNR to obtain 80 dB.

With the above simulation results, we can evaluate the computational complexity and the throughput rate fairly. To be compared with conventional recursive algorithms which require 2N additions and N+1 multiplications for computing one frequency component, the proposed recursive computation needs 4N+1 additions and 2N+1 multiplications. The traditional recursive structure needs two general multipliers, two adders, and two delay buffers for DCT-III computation as described by Wang et al. The recursive scheme according to the present invention needs two fixed multipliers, three adders, two delay buffers, and the data manipulation unit for DCT-III computation.

Figure 4:
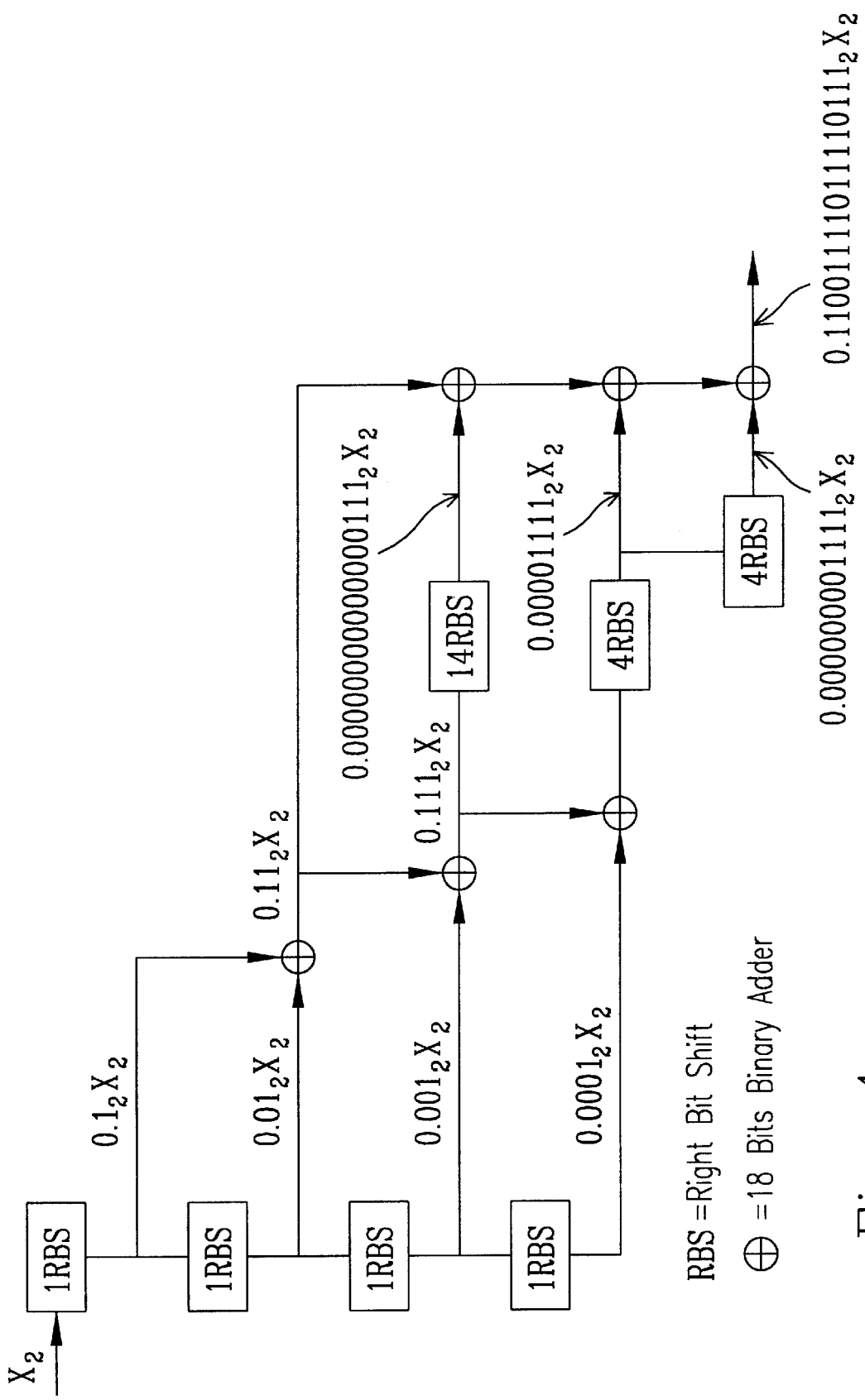
FIG. 4 shows the implementation of fixed-coefficient multiplier 2 cos(47π/128) according to the present invention.

To implement a 24-bit general multiplier, it requires 24 adders in 24-bit length for the conventional recursive structure to obtain 80 dB SNR. To realize a fixed coefficient multiplier, for example, with multiplicand $2\cos(47p/128) = 0.8104826281_{10} = 0.11001111011101110111_2$, only 6 adders in 18-bit length as shown in FIG. 4 are taken to attain the same accurate performance. The fixed recursive structure requires a considerably low hardware complexity.

Figure 5:
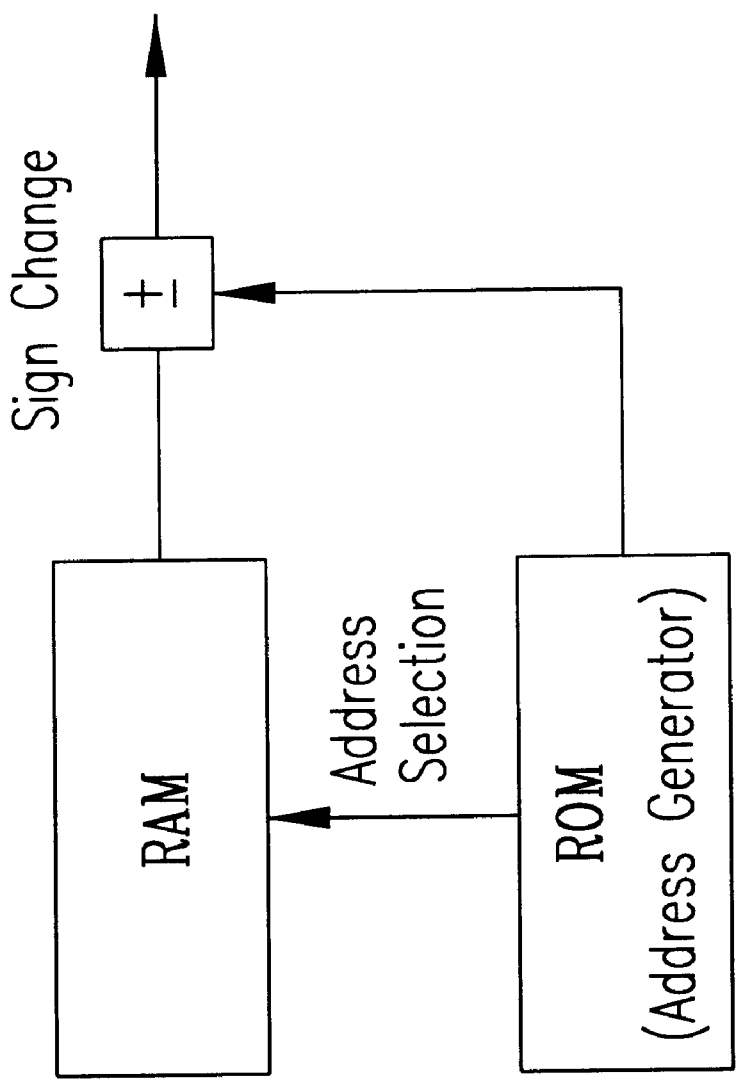
FIG. 5 shows the first realizing manner for the data manipulation unit according to the present invention.
Figure 6:
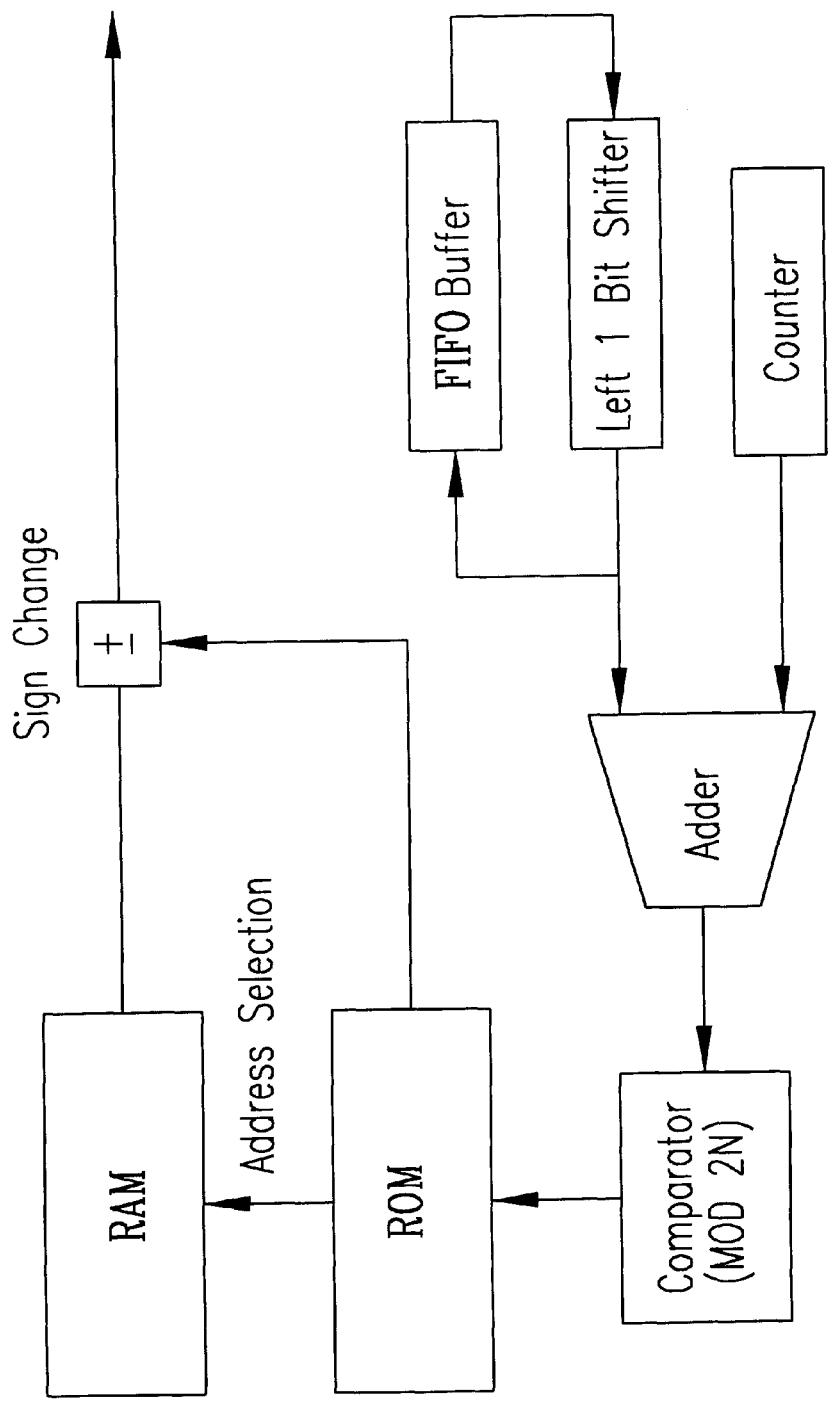
FIG. 6 shows the second realizing manner for the data manipulation unit according to the present invention.

As to the data manipulation units for DCT-III and DCT-IV, please refer to FIG. 5. The present invention provides the first kind of address generators completely based on an ROM. The input data are written into RAM in sequence. The ROM contains computed data of n(2k+1) mod 2N=qm' mod 2N or (2n+1)(2k+1)mod 2N=q(2m'+1)mod 2N and the mapping sequence and the sign change from n to m' for achieving an index mapping from m' to n. A second kind of address generator according to the present invention is shown in FIG. 6. The second kind of address generator includes an adder, a counter, a shifter, a comparator, an ROM, and a first-in-first-out (FIFO) buffer. Taking N=64 as an example, in a DCT-III situation, the output periodic sequence of the counter is {0, 1, 2, ..., 127}, and the initial content of the FIFO buffer is {0, 1, 2, ..., 127}. For a DCT-IV situation, the output periodic sequence of the counter is {1, 3, 5, ..., 127} and the initial content of the FIFO buffer is {1, 3, 5, ..., 127}. Actually, the modulo operation, which directly uses 7 least significant bits of the adders does not take any computation. Six LSBs are used to address the RAM and the carry bit is used to control the sign change. It is noted that the data manipulation unit can produce one pre-ordering input data per clock cycle before the recursive computation.

From the above discussions, it is obvious that the bottleneck of all DCT recursive structures is the multiplier associated with filter loop coefficient. The conventional 64-point DCT-III recursive structures normally require 64 iterations in use of a 24-bit general multiplier. The throughput rate of varied-coefficient recursive structures is limited by about 1536 24-bit additions for each transformed component. By performing 128 iterations, the proposed fixed-coefficient 64-point DCT-III recursive structures only need a fixed-coefficient multiplier (6 additions). The throughput rate of fixed-coefficient recursive structure is only limited by about 768 18-bit additions for each transformed component. Thus, the throughput rate of the fixed-coefficient recursive structures is overall two times faster than that of the varied-coefficient ones. Since the latency delay only happens in the recursive computation, the proposed recursive structures with twice throughput rate also only take one half of the latency delay as the varied-coefficient ones required.

5. Characteristics and Effectiveness

The present invention provides a new kind of fixed-coefficient recursive structures for computing discrete cosine transforms with a length of a power of two. By using number theorems, the fixed-coefficient recursive structures are developed from exploration of periodicity embedded in transform bases and form a complete residue system or a complete odd residue system. Based on permutation, sign change, and zero insertion of original inputs, the proposed filtering structures required fixed multipliers having low hardware complexity are better than the previous recursive methods which need general multipliers. In finite length machines, the present invention can properly select filter coefficients to avoid the nearly unstable state and to achieve low round-off errors in their transformations.

The discrete cosine transforms (DCTs) are widely applied to processing and compression of video and audio signals and other fields related to spectral analyses and parameter estimations. Besides, the recursive implementations are characterized in simple structure and local communication and are able to simplify the complexity in realization. A recursive DCT VLSI design is also characterized in formulation, regularization, and rank modulation.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

TABLE 1

Averaged SNRs (in dB) of the DCT-III Implementation Algorithms Realized in Finite-Word-Length Machines (N=64).

| Realization | Word Length | | | |
|---|---|---|---|---|
| Algorithms | 16 bits | 18 bits | 24 bits | 32 bits |
| Direct Implementation | 62.4488 | 74.6779 | 110.6337 | 159.0172 |
| Variable Coefficient | 48.7234 | 58.8661 | 94.2439 | 142.3898 |
| Fixed Coefficient(q=47) | 67.0644 | 79.3099 | 115.1087 | 163.4046 |
| Fixed Coefficient(q=1) | 31.4115 | 45.5038 | 80.7936 | 128.8874 |

TABLE 2

Averaged SNRs (in dB) of the DCT-III Implementation Algorithms Realized in Finite-Word-Length Machines (N=16).

| Realization | Word Length | | | |
|---|---|---|---|---|
| Algorithms | 16 bits | 18 bits | 24 bits | 32 bits |
| Direct Implementation | 74.4092 | 86.3863 | 122.5101 | 171.6760 |
| Variable Coefficient | 67.0540 | 79.0705 | 114.9538 | 162.6671 |
| Fixed Coefficient(q=15) | 75.4920 | 87.4662 | 124.2455 | 172.4326 |
| Fixed Coefficient(q=1) | 60.5579 | 73.1820 | 108.5038 | 156.6122 |

TABLE 3

Averaged SNRs (in dB) of the DCT-III Implementation Algorithms Realized in Finite-Word-Length Machines (N=8).

| Realization | Word Length | | | |
|---|---|---|---|---|
| Algorithms | 16 bits | 18 bits | 24 bits | 32 bits |
| Direct Implementation | 86.0035 | 101.2388 | 134.3697 | 184.4879 |
| Variable Coefficient | 75.1634 | 87.6756 | 124.1262 | 171.5373 |
| Fixed Coefficient(q=7) | 88.9340 | 101.7845 | 138.7615 | 183.7762 |
| Fixed Coefficient(q=1) | 59.3137 | 70.4249 | 106.9185 | 155.0966 |

What is claimed is:

1. An apparatus with a selective fixed-coefficient filter for recursively computing N points discrete cosine transform (DCT), comprising:
   a data manipulation unit with original N inputs with index n, for n=0, 1, . . . , N−1 to obtain 2N manipulated inputs $y_k[m]$ for m=0, 1, . . . , 2N−1 for computing the kth DCT coefficients for k=0, 1, . . . , N−1; and
   a second order filter for processing 2N manipulated inputs $y_k[m]$ of said data manipulation unit so as to perform said kth DCT coefficients through 2N−1 recursive operations.

2. The apparatus according to claim 1 wherein said N is a power of two.

3. The apparatus according to claim 1 wherein said data manipulation unit with said N original inputs is first post-padded N zeros for n=N, N+1, . . . , 2N−1 to obtain 2N zero-padded inputs y[n] for computing said N DCT coefficients.

4. The apparatus according to claim 3 wherein said N points discrete cosine transform is a second type of discrete cosine transform (DCT-II).

5. The apparatus according to claim 4 wherein said second order filter has a fixed loop coefficient and a fixed output coefficient in accordance with said kth DCT-II coefficient.

6. The apparatus according to claim 5 wherein said fixed loop coefficient is $2\cos(q\pi/2N)$ and said fixed output coefficient is $-\cos(q\pi/4N)$, where said q and said 2N are relatively prime and said q is a selected relatively larger positive integer but smaller than N−1.

7. The apparatus according to claim 6 wherein said data manipulation unit for computing said kth DCT-II coefficient obtains said 2N manipulated inputs $y_k[m]$ for m=0, 1, . . . , 2N−1 by permuting said 2N zero-padded inputs y[n], where n satisfies q(2m+1)=(2n+1)(2k+1)mod 4N and changing a sign of $(-1)^{r_4}$, where $r_4=\lceil(2n+1)(2k+1)/4N\rceil$.

8. The apparatus according to claim 6 wherein said q is equal to N−1.

9. The apparatus according to claim 8 wherein said data manipulation unit produces $y_k[m]=(-1)^{r_4}y[n]$ in sequence according to m for computing said kth DCT-II coefficient, in which n and m satisfy q(2m+1)=(2n+1l)(2k+1)mod 4N and $r_4=\lceil(2n+1)(2k+1)/4N\rceil$.

10. The apparatus according to claim 4 wherein said second type of discrete cosine transform is commonly called discrete cosine transform (DCT).

11. The apparatus according to claim 3 wherein said N points discrete cosine transform is a third type of discrete cosine transform (DCT-III).

12. The apparatus according to claim 11 wherein said second order filter has a fixed loop coefficient and a fixed output coefficient in accordance with said kth DCT-III coefficient.

13. The apparatus according to claim 12 wherein said fixed loop coefficient is 2 cos(qπ/2N) and said fixed output coefficient is cos(qπ/2N), where said q and said 2N are relatively prime and said q is a selected relatively larger positive integer but smaller than N−1.

14. The apparatus according to claim 13 wherein said data manipulation unit for computing said kth DCT-III coefficient obtains 2N manipulated inputs $y_k[m]$ for m=0, 1, . . . , 2N−1 by permuting said 2N zero-padded input y[n], in which n and m satisfy n(2k+1)mod 2N=qm mod 2N, and changing a sign of $(-1)^{r_3}$, where $r_3=\lceil n(2k+1)/2N\rceil$.

15. The apparatus according to claim 13 wherein said q is equal to N−1.

16. The apparatus according to claim 15 wherein said data manipulation unit produces $y_k[m]=(-1)^{r_3}y[n]$ in sequence according to m for computing said kth DCT-III coefficient, in which n and m satisfy n(2k+1)mod 2N=qm mod 2N, and $r_3=\lceil n(2k+1)/2N\rceil$.

17. The apparatus according to claim 11 wherein said third type of discrete cosine transform is commonly called inverse discrete cosine transform (IDCT).

18. The apparatus according to claim 11 wherein said data manipulation unit comprises an address generator based on a first read only memory (ROM).

19. The apparatus according to claim 18 wherein said ROM contains computed data of n(2k+1)mod 2N=qm' mod 2N and the mapping sequence and the sign change from n to m' for completing an index mapping from m' to n.

20. The apparatus according to claim 18 wherein said ROM contains computed data of (2n+1)(2k+1)mod 2N=q (2m'+1)mod 2N and the mapping sequence and the sign change from n to m' for completing an index mapping from m' to n.

21. The apparatus according to claim 3 wherein said N points discrete cosine transform is a fourth type of discrete cosine transform (DCT-IV).

22. The apparatus according to claim 21 wherein said second order filter has a fixed loop coefficient and a fixed output coefficient in accordance with said kth DCT-IV coefficient.

23. The apparatus according to claim 22 wherein said fixed loop coefficient is 2 cos(qπ/2N) and said fixed output coefficient is −cos(qπ/4N), where said q and said 2N are relatively prime and said q is a selected relatively larger positive integer but smaller than N−1.

24. The apparatus according to claim 23 wherein said data manipulation unit for computing said kth DCT-IV coefficient obtains said 2N manipulated inputs $y_k[m]$ for m =0,_1, . . . , 2N−1 by permuting said 2N zero-padded inputs y[n], where n satisfies q(2m+1)=(2n+1)(2k+1)mod 4N and changing a sign of $(-1)^{r_4}$, where $r_4=\lceil(2n+1)(2k+1)/4N\rceil$.

25. The apparatus according to claim 23 wherein said q is equal to N−1.

26. The apparatus according to claim 25 wherein said data manipulation unit produces $y_k[m]=(-1)^{r_4}y[n]$ in sequence according to m for computing said kth DCT-IV coefficient, in which n and m satisfy q(2m+1)=(2n+1)(2k+1)mod 4N and $r_4=\lceil(2n+1)(2k+1)/4N\rceil$.

27. The apparatus according to claim 21 wherein said data manipulation unit comprises an address generator based on a third ROM.

28. The apparatus according to claim 27 wherein said ROM contains computed data of n(2k+1)mod 2N=qm' mod 2N and the mapping sequence and the sign change from n to m' for completing an index mapping from m' to n.

29. The apparatus according to claim 27 wherein said ROM contains computed data of (2n+1)(2k+1)mod 2N=q (2m'+1)mod 2N and the mapping sequence and the sign change from n to m' for completing an index mapping from m' to n.

* * * * *

UNITED STATES PATENT AND TRADEMARK OFFICE
CERTIFICATE OF CORRECTION

PATENT NO. : 6,343,304 B1
DATED : January 29, 2002
INVENTOR(S) : Jar-Ferr Yang and Chih-Peng Fan It is certified that error appears in the above-identified patent and that said Letters Patent is hereby corrected as shown below:

Column 7,
Line 59, the formula should read:
--
$$Y_4(k) = (-1) \sum_{m=0}^{2N-1} y_k(2N-1-m)\cos(\pi(m+1\,2)/2N)$$
--

Column 8,
Line 62, the formula should read:
--
$$Y_2(k+1) = \sum_{n=0}^{N-1} \tilde{y}(n)\cos\left(\frac{(2n+1)(2k+1)\pi}{4N}\right) - Y_2(k)$$
--

Column 10,
Line 22, the formula should read:
--
$$\frac{Y_3(k,z)}{Y_k'(z)} = \frac{\cos(\hat{\theta}) - z^{-1}}{1 - 2\cos(\hat{\theta})z^{-1} + z^{-2}}$$
--

Line 44, the formula should read:
--
$$\tilde{y}_k(2m+1)$$
--

UNITED STATES PATENT AND TRADEMARK OFFICE
CERTIFICATE OF CORRECTION

PATENT NO.    : 6,343,304 B1
DATED         : January 29, 2002
INVENTOR(S)   : Jar-Ferr Yang and Chih-Peng Fan It is certified that error appears in the above-identified patent and that said Letters Patent is hereby corrected as shown below:

<u>Column 15,</u>
Line 8, the formula should read:

-- $q(2m+1) = (2n+1)(2k+1) \mod 4N$ --

Signed and Sealed this

First Day of October, 2002

*Attest:*

*Attesting Officer*

JAMES E. ROGAN
*Director of the United States Patent and Trademark Office*